US010732624B2

(12) United States Patent
Nelson et al.

(10) Patent No.: US 10,732,624 B2
(45) Date of Patent: Aug. 4, 2020

(54) USER DATA DIGESTION FOR AUTONOMOUS CAR IMPLEMENTATION

(71) Applicant: BANK OF AMERICA CORPORATION, Charlotte, NC (US)

(72) Inventors: Mark Allan Nelson, Waxhaw, NC (US); Ashish B. Tajpuria, San Francisco, CA (US); Karen Lea MacQueen, Lyndhurst, OH (US); Stephen Philip Selfridge, Huntersville, NC (US); Steven Michael Twombly, Saco, ME (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 329 days.

(21) Appl. No.: 15/986,229

(22) Filed: May 22, 2018

(65) Prior Publication Data
US 2019/0361430 A1 Nov. 28, 2019

(51) Int. Cl.
| | |
|---|---|
| *G05D 1/00* | (2006.01) |
| *G01C 21/36* | (2006.01) |
| *G06Q 20/20* | (2012.01) |
| *G05D 1/02* | (2020.01) |
| *H04L 29/06* | (2006.01) |

(52) U.S. Cl.
CPC ......... *G05D 1/0022* (2013.01); *G01C 21/362* (2013.01); *G05D 1/021* (2013.01); *G06Q 20/202* (2013.01); *H04L 63/0815* (2013.01); *H04L 63/0861* (2013.01); *G05D 1/0088* (2013.01)

(58) Field of Classification Search
USPC ...................................... 701/23–28
See application file for complete search history.

(56) References Cited

U.S. PATENT DOCUMENTS

| | | | |
|---|---|---|---|
| 6,490,513 B1* | 12/2002 | Fish ....................... | G07C 5/008 701/32.6 |
| 8,752,147 B2 | 6/2014 | Tamai et al. | |
| 9,173,076 B2* | 10/2015 | Tateishi ................ | H04W 12/06 |
| 9,292,832 B2 | 3/2016 | Goel et al. | |
| 9,413,827 B2 | 8/2016 | Sharma et al. | |
| 9,438,440 B2 | 9/2016 | Burns et al. | |
| 9,680,726 B2 | 6/2017 | Sharma et al. | |
| 9,699,814 B2 | 7/2017 | Zakaria et al. | |
| 9,716,595 B1 | 7/2017 | Kravitz et al. | |
| 9,717,012 B2* | 7/2017 | Zakaria ............. | H04M 1/72519 |
| 9,742,740 B2 | 8/2017 | Fransen | |
| 9,774,497 B2 | 9/2017 | Britt et al. | |
| 9,774,507 B2 | 9/2017 | Britt et al. | |
| 9,838,390 B2 | 12/2017 | Zakaria | |
| 9,843,929 B2 | 12/2017 | Zimmerman et al. | |

(Continued)

*Primary Examiner* — Jonathan L Sample
(74) *Attorney, Agent, or Firm* — Michael A. Springs; Moore & Van Allen PLLC; Nicholas C. Russell (57) ABSTRACT

Embodiments of the present invention provide a system for generating a communicable linkage and communication channel between various user devices, including smart devices, with a vehicle system. The system converts data from the user devices into readable format for implementation into a vehicle system. The implementation may include autonomous implementation for location transmission and guidance for the vehicle. Upon authentication of the user to the vehicle, the system directs the vehicle based on the converted data.

20 Claims, 7 Drawing Sheets

(56) References Cited

U.S. PATENT DOCUMENTS

| | | | |
|---|---|---|---|
| 9,847,961 B2 | 12/2017 | Shuman et al. | |
| 9,882,912 B2 | 1/2018 | Joo | |
| 9,900,171 B2 | 2/2018 | Guedalia et al. | |
| 9,900,172 B2 | 2/2018 | Goel et al. | |
| 10,334,050 B2* | 6/2019 | Kentley-Klay | H04L 67/125 |
| 10,484,386 B2* | 11/2019 | Storr | G06F 16/337 |
| 2015/0185034 A1* | 7/2015 | Abhyanker | G06Q 50/01 |
| | | | 701/23 |
| 2015/0358777 A1 | 12/2015 | Gupta | |
| 2016/0125735 A1* | 5/2016 | Tuukkanen | G08G 1/202 |
| | | | 701/23 |
| 2016/0197769 A1 | 7/2016 | Britt et al. | |
| 2016/0197772 A1 | 7/2016 | Britt et al. | |
| 2016/0197786 A1 | 7/2016 | Britt et al. | |
| 2016/0334230 A1* | 11/2016 | Ross | G01C 21/3415 |
| 2016/0334797 A1* | 11/2016 | Ross | G06Q 10/08 |
| 2017/0123422 A1* | 5/2017 | Kentley | B60Q 3/00 |
| 2017/0126810 A1* | 5/2017 | Kentley | G06Q 50/30 |
| 2017/0132934 A1* | 5/2017 | Kentley | G08G 1/202 |
| 2017/0195324 A1* | 7/2017 | Yamamoto | H04W 76/15 |
| 2017/0200250 A1 | 7/2017 | Grissen et al. | |
| 2017/0344010 A1* | 11/2017 | Rander | G05D 1/0022 |
| 2017/0359343 A1 | 12/2017 | Sterl et al. | |
| 2018/0137454 A1* | 5/2018 | Kulkarni | G08G 5/0069 |
| 2018/0189550 A1* | 7/2018 | McCombe | G06K 9/00281 |
| 2018/0253805 A1* | 9/2018 | Kelly | G06Q 20/18 |
| 2018/0321674 A1* | 11/2018 | Chase | G05D 1/0022 |
| 2018/0338241 A1* | 11/2018 | Li | H04L 67/1097 |
| 2019/0121357 A1* | 4/2019 | Zhang | G05D 1/0088 |
| 2019/0291719 A1* | 9/2019 | Tiziani | B60W 50/085 |

\* cited by examiner

USER DATA DIGESTION FOR AUTONOMOUS CAR IMPLEMENTATION

BACKGROUND

Manual interactions between users, user devices, and vehicles traditionally involve manual conveyance of data and information are can be inefficient and often insecure thereby reducing productivity and security associated with all parties involved. As such, there exists a need for a system to improve the efficiency, speed, and data security of performing interactions.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention provide a system that generates a communicable linkage and communication channel between user's various devices and an autonomous vehicle system. The system provides data associated with the user, such as lists, locations calendar information, account information, and the like in a readable format to the autonomous vehicle system. The system may parse the date into a readable format for the vehicle system to include various stopping points, locations of destinations, events, calendar plans, travel plans, and the like. The system may transmit the data to the autonomous vehicle system in a readable format. Upon indication that the user is authenticated as the individual in the vehicle, the system may automatically direct the vehicle to the location based on the data received about the user. As such, the system may preprogram routes or allow the vehicle to automatically drive the routes because the vehicle knows the locations and travel plans of the user based on the system digestion and presentation of the user data.

Embodiments of the present invention address the above needs and/or achieve other advantages by providing apparatuses (e.g., a system, computer program product and/or other devices) and methods for autonomous vehicle data digestion and implementation, the invention comprising: identifying a user within the autonomous vehicle based on an indication from an autonomous vehicle system or a user device; identifying devices associated with the user; scanning data across the devices associated with the user and identify one or more data points from the scanned data; continually, in real-time, scanning data from the devices associated with the user; converting data format of the one or more data points from the scanned data into readable format for the autonomous vehicle of the user; calculating program functions for routes, locations, notifications, and plans for the autonomous vehicle based on the one or more data points; authenticating the user within the vehicle based on at least one authentication point; and transmitting and allowing autonomous vehicle to the program functions based on the authentication of the user.

In some embodiments, one or more data points comprise data for autonomous vehicle digestion comprising routes, locations, notifications, and plans that translate to programmed functions for routes, locations, notifications, and plans for the autonomous vehicle upon next initiation of the vehicle.

In some embodiments, transmitting and allowing the autonomous vehicle to the program functions based on the authentication of the user, further comprises providing a readable format of the data points to the autonomous vehicle for route guidance and route planning for the user.

In some embodiments, identifying devices associated with the user further comprises identifying a wireless network of a user and identify all of the devices in communication with the wireless network.

In some embodiments, the invention further comprises generating a communicable linkage with the autonomous vehicle system and the user device to initiate the vehicle authentication for location access.

In some embodiments, authenticating the user within the vehicle based on at least one authentication point further comprises authenticating the user based on user device co-localization, user vehicle preferences, vehicle biometric identification indicators, or third party system authentications. In some embodiments, the authentication point of user device co-localization further comprises identifying, via near field communication linkage, a linkage between the user device and the autonomous vehicle system indicating the user associated with the user device is within the vehicle. In some embodiments, the authentication point of user vehicle preferences further comprises linking to the autonomous vehicle system to identify seat, radio, climate, and driving preferences of the user. In some embodiments, the authentication point of vehicle biometric identification indicators further comprise authenticating a user via biometric sensors distributed on or within the vehicle. In some embodiments, the authentication point of third party system authentications further comprises identifying the user authentication into third party applications while within the vehicle.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "automobile" or "vehicle" as used herein may refer to any vehicle for transportation of a user from one or more locations. In some embodiments, the term "entity" or "third party entity" as used herein may be any merchant offering products or services to one or more users. This may include Quick Service Restaurants (QSR), gas stations, merchants providing parking spaces, toll booths, convenience stores, pharmacy, wholesale merchants, and/or the like. The term "remote device" as used herein may be any computing device utilized by third party entities. The term "third party entity device" may be any computing device provided by third party entities at third party entity locations. This may include point of sale (POS) provided by third party entities at any of the third party locations. In some embodiments, an "authentication location" may be a physical or digital location that may require some sort of authentication or misappropriation protection to gain access. For example, the physical locations may include ATM machines, tollbooths, parking lots, gas stations (fuel payments), resource distributions, or the like. The digital locations may include one or more web-pages or mobile device pages that require authentication in order to gain access.

In accordance with embodiments of the invention, an "interaction" may be a transaction, transfer of funds, transfer of resources, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions have already occurred, are in the process of occurring or being processed, or they have yet to be processed/posted by one or more financial institutions.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Embodiments of the present invention provide a system for generating a communicable linkage and communication channel between various user devices, including smart devices, with a vehicle system. The system converts data from the user devices into readable format for implementation into a vehicle system. The implementation may include autonomous implementation for location transmission and guidance for the vehicle. Upon authentication of the user to the vehicle, the system directs the vehicle based on the converted data.

Figure 1:
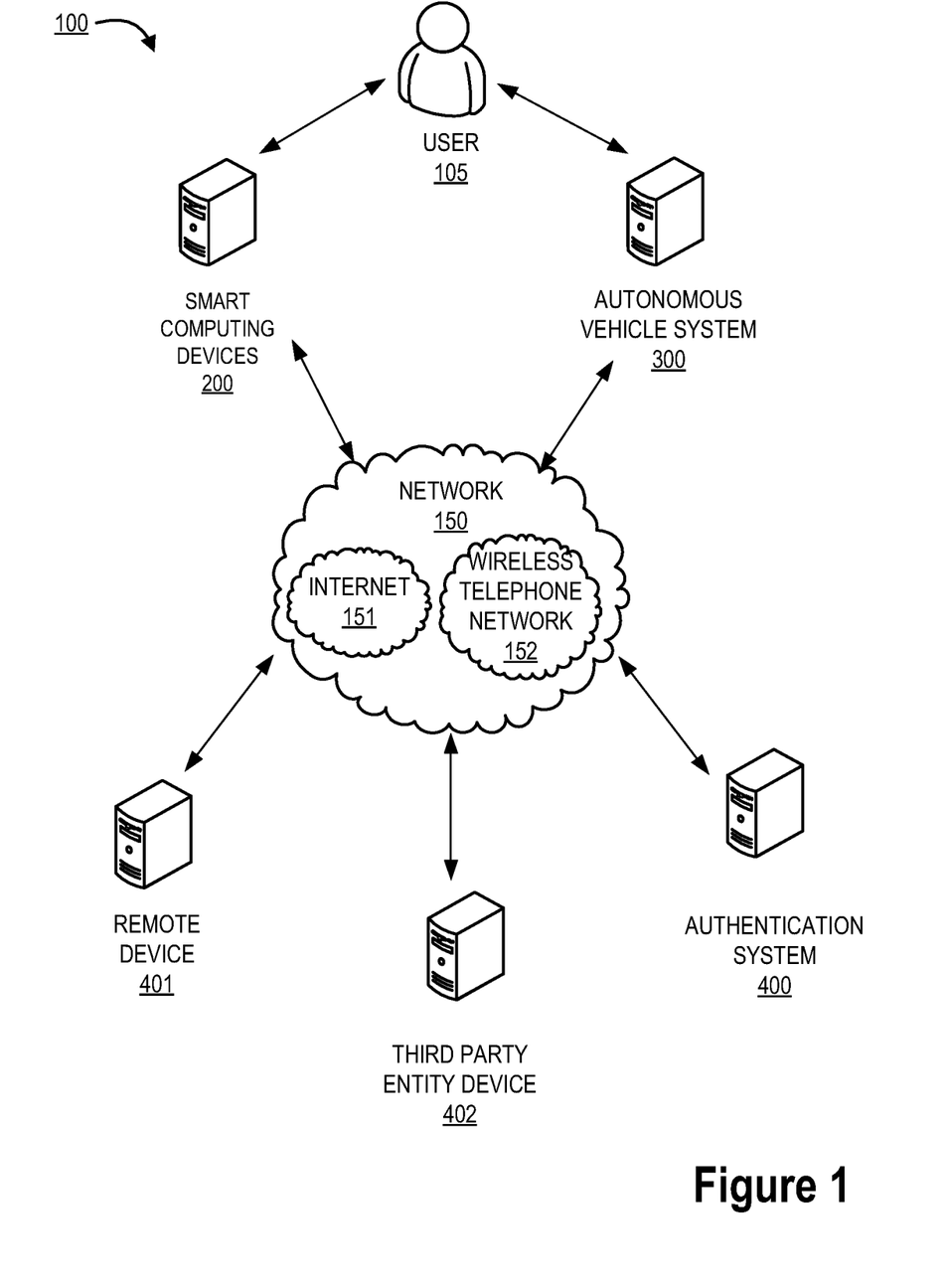
FIG. 1 presents an autonomous car digestion and implementation system environment, in accordance with an embodiment of the present invention.

FIG. 1 provides a block diagram illustrating an autonomous car digestion and implementation environment 100, in accordance with some embodiments of the invention. As depicted in FIG. 1, the operating environment 100 may include an authentication system 400 interacting with a smart computing device 200 and autonomous vehicle system 300 of a user 105, one or more remote devices 401, one or more third party entity devices 402, using a network 150 that includes an internet 151 and wireless telephone network 152. In such an embodiment, the authentication system 400 communicates with a financial institution system to complete one or more interactions. In some embodiments, the authentication system 400 may be a part of a financial institution system (not shown). In alternate embodiments, the authentication system 400 may be a part of the autonomous vehicle system 300. In some embodiments, the authentication system 400 may be part of a smart chip which is placed in the autonomous vehicle system 300. In some embodiments, the authentication system 400 may interact with smart computing devices and automobiles associated with a plurality of users (not shown) at any given instance. The user 105 may be an individual associated with or owning a vehicle with an autonomous vehicle system 300 and a smart computing device 200.

The environment 100 also may include a smart computing device 200 of the user 105. The smart computing device 200 may include any machine, apparatus, system or the like that may be connected to and communicate with other devices over a network 150. As used herein the smart computing device 200 may also be referred to as a user device. The smart computing device 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology.

Figure 2:
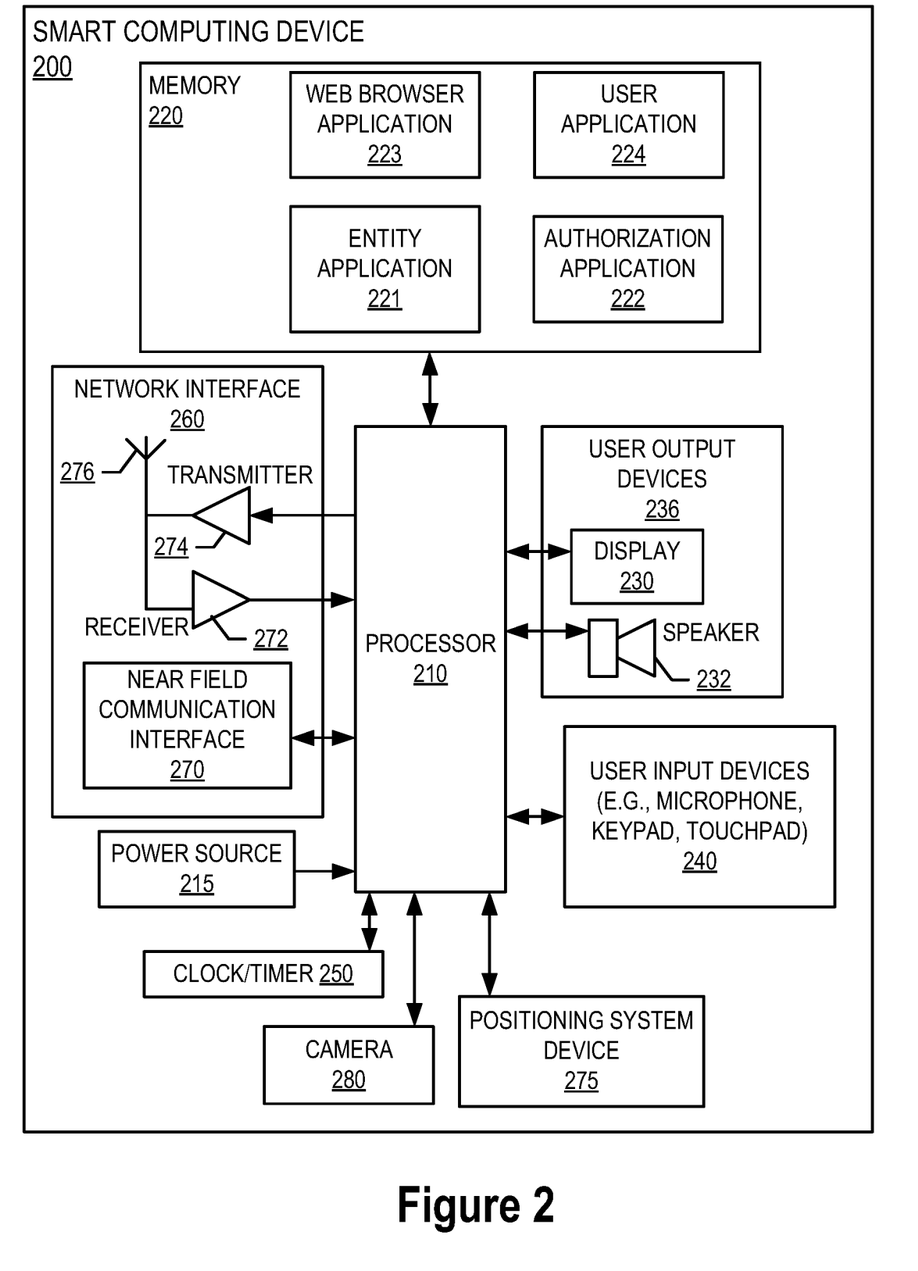
FIG. 2 presents a block diagram illustrating a smart computing device, in accordance with an embodiment of the present invention.

Referring now to FIG. 2, the smart computing device 200 may be any computing device utilized by the user 105. In embodiments of the present invention, the smart computing device may be any device of the user connected to the automobile of the user via a wired (e.g., USB port) or wireless technology. The smart computing device may be any wearable device, laptop, mobile device, smart phone device, PDA, tablet, or any other mobile device. In one embodiment of the invention, there may be multiple smart computing devices, wherein the multiple smart computing devices may be a mobile telephone and a smart watch. Other types of smart computing devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In one embodiment of the present invention, the smart computing device 200 is a mobile device.

Some embodiments of the smart computing device 200 include a processor 210 communicably coupled to such devices as a memory 220, user output devices 236, user input devices 240, and a network interface 260. The smart computing device 200 further includes a power source 215, such as a battery, for powering various circuits and other devices that are used to operate the smart computing device 200. Embodiments of the smart computing device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the smart computing device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223. The web browser application 223 may then allow the smart computing device 200 to transmit and receive web content, such as, for example, location-based content and/or other web page content, according to a Wireless Application Protocol (WAP), Hypertext Transfer Protocol (HTTP), and/or the like. The memory device 220 may include other applications such as an entity application 221, a user application 224, authorization application 222, and/or the like. The user application 224 may be a digital wallet application or any application that maintains virtual vehicles which is provided by an entity system. In some embodiments, entity application 221 may be a mobile banking application or other third party entity application, such as weather, games, or the like. In some embodiments, the authorization application 222 allows the smart computing device 200 to interact with entity systems and authentication system 400.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the smart computing device 200 may be configured to operate with one or more air interface standards, communication protocols, modulation types, and access types. By way of illustration, the smart computing device 200 may be configured to operate in accordance with any of a number of first, second, third, and/or fourth-generation communication protocols and/or the like. For example, the smart computing device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The smart computing device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart vehicle, key vehicle, proximity vehicle, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, and/or otherwise supported in and/or on the smart computing device 200. In some embodiments, the NFC interface 270 is not supported in and/or on the smart computing device 200, but the NFC interface 270 is otherwise operatively connected to the smart computing device 200 (e.g., where the NFC interface 270 is a peripheral device plugged into the smart computing device 200). Other apparatuses having NFC interfaces mentioned herein may be configured similarly. In some embodiments, the NFC interface 270 of the smart computing device 200 is configured to contactlessly and/or wirelessly communicate information to and/or from a corresponding NFC interface of another apparatus (e.g., a point of sale (POS) device, an automated teller machine (ATM) or another mobile or computing device). In one embodiment of the present invention, the NFC interface of the smart computing device 200 wirelessly communicates information (virtual vehicle information such as virtual vehicle number, CVV code, expiration date) stored in the user application 224 to perform a transaction.

As described above, the smart computing device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the smart computing device 200 to transmit data, may include any of a number of devices allowing the smart computing device 200 to transmit data, such as a keypad, keyboard, touch-screen, touchpad, microphone, mouse, joystick, other pointer device, button, soft key, and/or other input device(s). The user interface may also include a camera 280, such as a digital camera.

The smart computing device 200 may also include a positioning system device 275 that is configured to be used by a positioning system to determine a location of the smart computing device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the smart computing device 200. In other embodiments, the positioning system device 275 includes a proximity sensor or transmitter, such as an RFID tag, that can sense or be sensed by devices known to be located proximate a location to determine that the smart computing device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the smart computing device 200 and/or one or more of the process/method steps described herein.

These applications also typically provide a graphical user interface (GUI) on the display 230 that allows the user 105 to communicate with the smart computing device 200 to other devices or systems on the network. The memory 220 can also store any of a number of pieces of information, and data, used by the smart computing device 200 and the applications and devices that make up the smart computing device 200 or are in communication with the smart computing device 200 to implement the functions of the smart computing device 200 and/or the other systems described herein. For example, the memory 220 may include such data as user authentication information.

Figure 3:
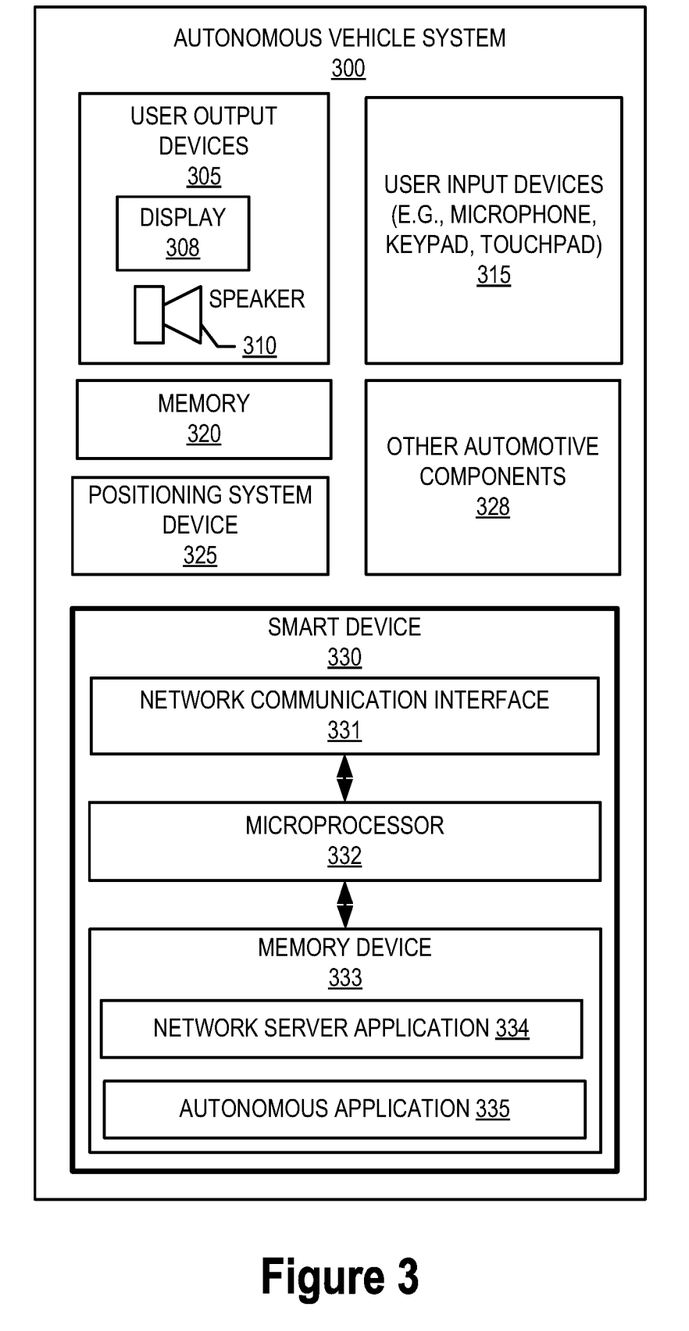
FIG. 3 presents a block diagram illustrating an autonomous vehicle system, in accordance with an embodiment of the present invention.

Referring now to FIG. 3, the autonomous vehicle system 300 comprises one or more components of an automobile. The automobile may be any type of vehicle, such as a vehicle, truck, van, all-terrain vehicle, or the like that comprises an autonomous system or portion to the vehicle. The autonomous vehicle may include and comprise user output devices 305, user input devices 315, memory 320, positioning system device 325, other automotive components, and a smart device 330. In some embodiments, the smart device 330 may be a smart chip. The smart chip may be a micro device in the automobile. In embodiments of the invention, the smart chip 330 is provided by a third party entity, such as a financial institution. The smart chip 330 may be integrated into any vehicle system components and comprise with user input and output devices. In some embodiments, the smart chip is maintained by a third party entity. As shown in the FIG. 3, the smart chip 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the smart chip 330 may utilize a transceiver of the automobile. The microprocessor 332 is configured to provide signals to and receive signals from the transmitter and receiver, respectively. The smart chip 330 may utilize wireless network including satellite or any other wireless network of the automobile to provide signals and receive signals. In some embodiments, the smart chip 330 may utilize wireless network of the smart computing device 200 connected to the autonomous vehicle system 300 to provide signals and receive signals to perform one or more steps in the process flows described below. For example, the smart chip may identify an input from a user via any of the user input devices, such as a smart computing device 200 of the user, and may alert the system. In one example, the smart chip may identify that the user has entered a destination location via the user input devices and alerts the system to trigger processes.

The network communication interface 331 may also include a near field communication (NFC) interface. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, and/or otherwise supported in and/or on the smart computing device 200. In some embodiments, the NFC interface is not supported in and/or on the smart computing device 200, but the NFC interface is otherwise operatively connected to the smart computing device 200. For example, smart computing device 200 may be internally connected to the electronic and communication system of the automobile and may utilize the NFC interface of the automobile. In some embodiments, the NFC interface of the smart computing device 200 is configured to contactlessly and/or wirelessly communicate information to and/or from a corresponding NFC interface of another apparatus (e.g., a point of sale (POS) device, an automated teller machine (ATM) or another mobile, remote device, third party entity devices, or computing device). In one embodiment of the present invention, the NFC interface of the smart computing device 200 wirelessly communicates information (virtual vehicle information such as virtual vehicle number, CVV code, expiration date) stored in the memory 320 of the automobile or user application 224 of the smart computing device 200 to and/or from a corresponding NFC interface.

The memory device 333 may include one or more applications or information accessed or received by the smart chip 330. The memory device, as shown, comprises one or more applications including a network server application 334, authentication application 335 and/or the like. The network server application 334 may be configured to cause the microprocessor to interact with other components of the automobile, smart computing device 200, authentication system 400, remote device 401, third party entity device 402, and/or other device associated with the network 150. The authentication application may be utilized in conjunction with the authentication system 400 to perform one or more steps in the process flow described herein for user authentication. The smart chip 330 may receive instructions from the resource distribution triggering system to perform one or more steps described herein. In some embodiments, the smart chip 330 may receive information from the authentication system 400, the third party entity device 402, or the remote device 401 and communicate the information to the user 105 utilizing the user output devices 305 including, but not limited to, display 308 and speaker 310 of the automobile 300. In some embodiments, the smart chip 330 may receive information from the user 105 via the user input devices including, but not limited to, microphone, keypad, touchpad, and/or the like of the automobile and communicate the information received form the user to the authentication system 400, the third party entity device 402, or the remote device 401 to perform one or more steps in the process flows described herein. In some embodiments of the present invention, the smart chip 330 may identify current location of the automobile utilizing the positioning system device 325 of the automobile. In some other embodiments, the smart chip 330 may utilize other automotive components 328 or information available in the other automotive components 328 of the automobile. The automotive components, may include any body and main parts, electrical and electronics (including navigation system, gauges and meters, sensors, electrical switches, cameras, audio/video devices, and/or the like), interior components (vehicle seats, floor components, and/or the like), power train and chassis, and/or the like. In some embodiments, the automobile further comprises a chip reader to facilitate completion of one or more interactions. In some embodiments, the system comprises any other built in mechanism to facilitate completion of one or more interactions. All or some components of the automobile described above may be considered as an autonomous vehicle system.

Figure 4:
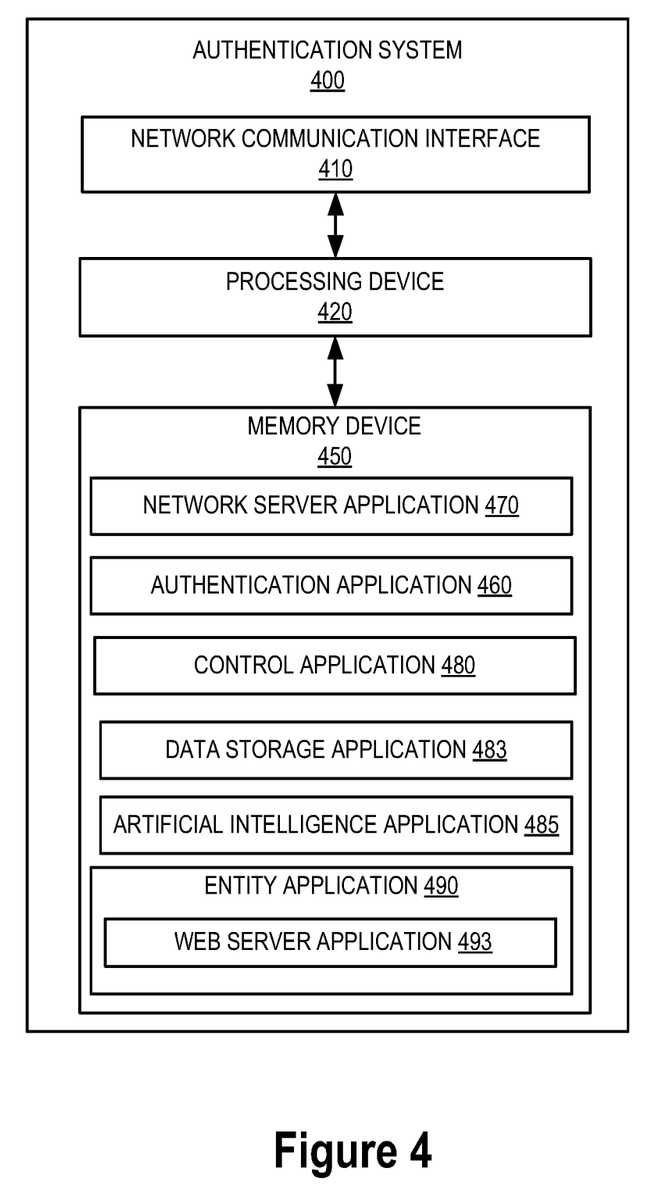
FIG. 4 presents a block diagram illustrating a resource distribution triggering system, in accordance with an embodiment of the present invention.

FIG. 4 provides a block diagram illustrating the authentication system 400, in greater detail, in accordance with embodiments of the invention. As illustrated in FIG. 4, in one embodiment of the invention, the authentication system 400 includes one or more processing devices 420 operatively coupled to a network communication interface 410 and a memory device 450. In certain embodiments, the authentication system 400 is operated by an entity, such as a financial institution. In some embodiments, the authentication system 400 is part of a system of the autonomous vehicle system 300, wherein the authentication system 400 may be embedded within any component of the automobile. In some embodiments of the invention, the authentication system 400 is part of the smart chip 330, wherein the smart chip 330 is placed in the automobile and is a part of the automobile. In such an embodiment, the system establishes a direct communication link with the autonomous vehicle system. In some embodiments, the authentication system 400 may be an independent system, wherein the authentication system 400 communicates with the automobile to perform one or more actions described in the process flows below via the smart chip 330 of the automobile. In such an embodiment, the system establishes a communication link with the autonomous vehicle system via the smart chip. For example, the system may communicate with user input devices 315, positioning device 325, other automotive components 328, and user output devices 305 via the smart chip 330. In such embodiments, the system may connect with the smart computing device 200 of the user via the smart chip 330, wherein the smart computing device 200 is present with the user and wherein the smart computing device 200 may be connected with the autonomous vehicle system 300. In some embodiments, the smart computing device 200 may not be connected with the autonomous vehicle system 300 via wired or wireless technology.

It should be understood that the memory device 450 may include one or more applications and one or more databases or other data structures/repositories. The memory device 450 also includes computer-executable program code that instructs the processing device 420 to operate the network communication interface 410 to perform certain communication functions of the authentication system 400 described herein. For example, in one embodiment of the authentication system 400, the memory device 450 includes, but is not limited to, a network server application 470, an authentication application 460, control application 480, a data storage application 483, artificial intelligence engine application 485 and other computer-executable instructions or other data. The computer-executable program code of the network server application 470, the authentication application 460, the control application 480, and the data storage application 483, artificial intelligence engine application 485 may instruct the processing device 420 to perform certain logic, data-processing, and data-storing functions of the authentication system 400 described herein, as well as communication functions of the authentication system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150. The authentication system 400, communicates with the smart chip 330 of the automobile to perform various steps described herein. The authentication system 400, communicates with remote devices 401 and third party entity devices 402 to perform various steps described herein.

Figure 5:
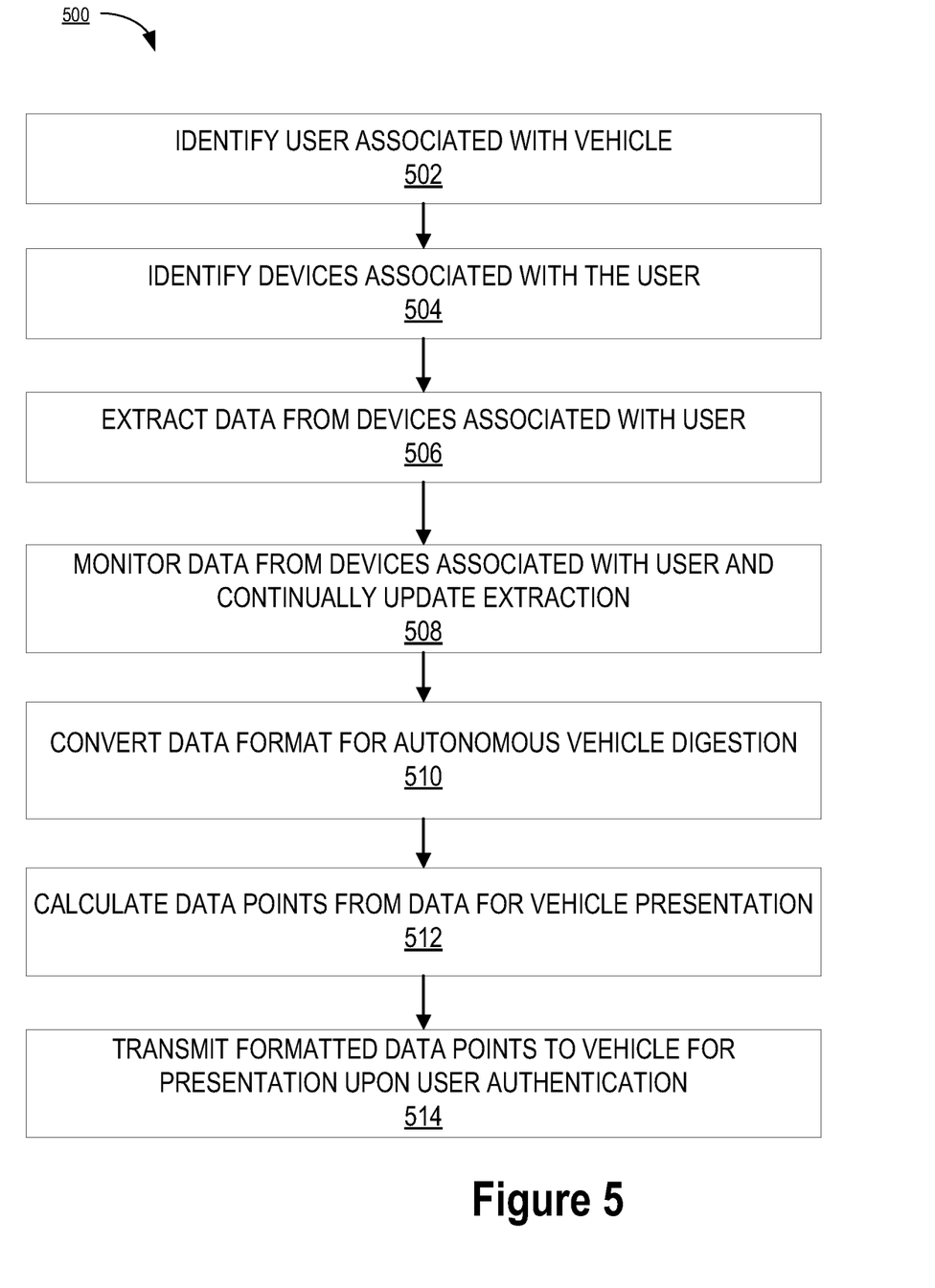
FIG. 5 presents a process flow for user data digestion for autonomous car implementation, in accordance with an embodiment of the present invention.

FIG. 5 presents a process flow for user data digestion for autonomous car implementation 500, in accordance with an embodiment of the present invention. As illustrated in block 502, the process 500 is initiated by identifying a user associated with the vehicle. In this way, the system may link a user to a vehicle. This may be based on user input, vehicle identification of the user, system identification, and the like.

Upon identification of a user being associated with the vehicle, the system may identify devices associated with the user, as illustrated in block 504. The system may identify the devices based on identification of devices linked to a wireless network associated with the user, such as internet of things device (IoT devices), smart devices, devices with communication capabilities, or the like. These may include home appliances, cellular phones, computers, tablets, speakers, televisions, radios, other handheld devices, smart home devices, or the like. The system may identify a user network and identify the other devices associated with that network. In this way, the system may recognize the devices on the network and communicably link to those devices.

Upon identification of the devices associated with the user, the system may form a communicable linkage with the user devices and integrate within the devices. The system may then extract data from the devices associated with the user, as illustrated in block 506. The data may be any data from the devices to create data points usable by the autonomous vehicle. As such, the data points may lead to an identification of trips, routes, required product/service purchases and a location associated with the same, notifications, reminders, calendar information, or the like. The system, as illustrated in block 508, may continue to monitor data from the devices associated with the user and continually update the extraction for real-time data for autonomous vehicle digestion.

As illustrated in block 510, the process 500 continues by converting the data into a format for the specific autonomous vehicle and the autonomous vehicle digestion. In this way, the system may take one or more data formats from various devices associated with the user and convert those data formats into a readable format for the autonomous vehicle. The system may continue by calculating data points from the data for vehicle presentation, as illustrated in block 512. In this way, the system may identify data points indicative of potential routs, locations, notifications, or plans for the vehicle. The system may digest those data points and develop a plan for the function of the vehicle for providing mapped directions, notifications, effective and efficient routing, and the like.

Finally, as illustrated in block 514, the process 500 is finalized by transmitting the formatted data points to the vehicle for presentation upon user authentication.

Figure 6:
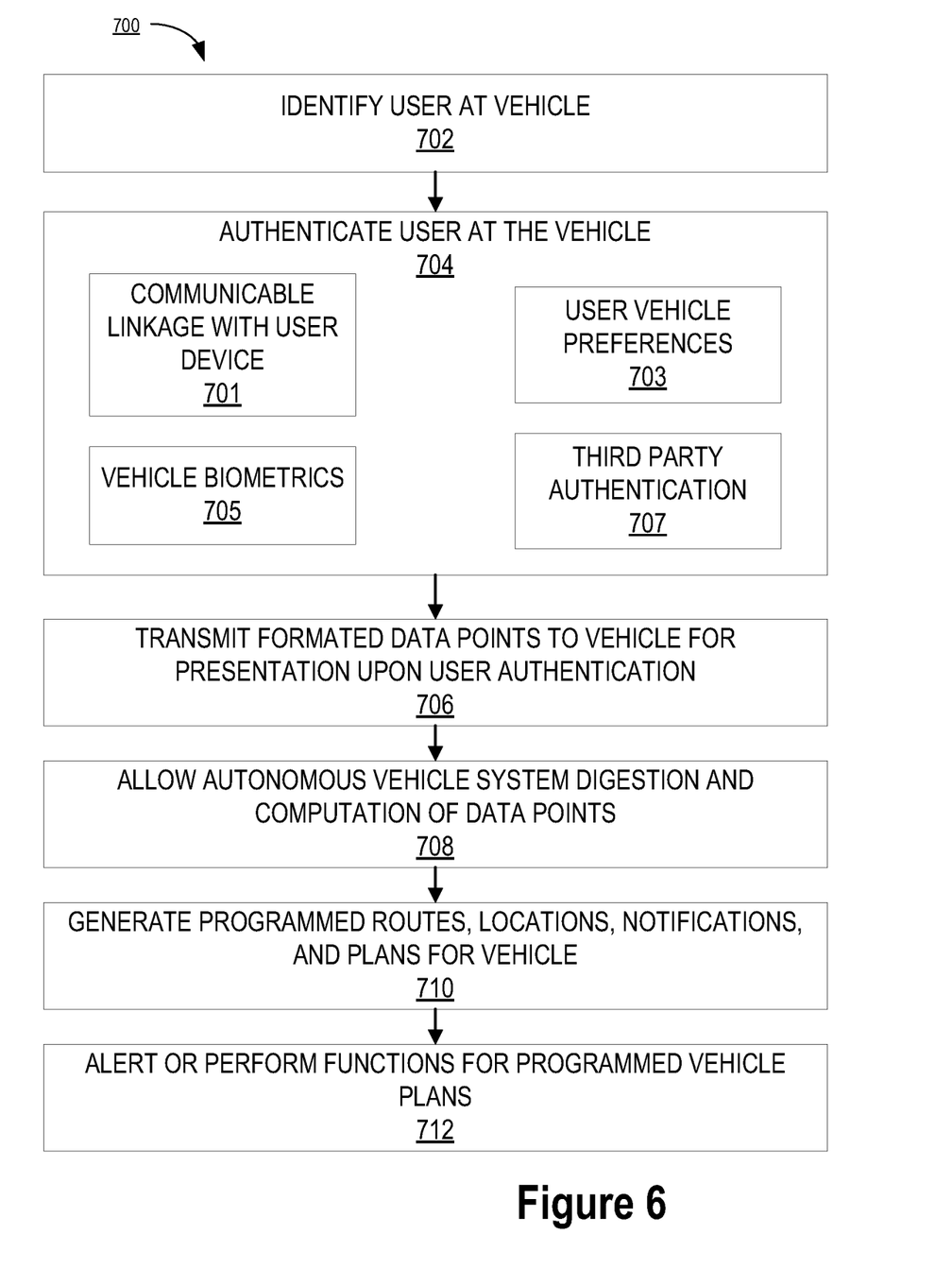
FIG. 6 presents a process flow for autonomous car implementation, in accordance with an embodiment of the present invention.

FIG. 6 presents a process flow for autonomous car implementation 700, in accordance with an embodiment of the present invention. As illustrated in block 702, the process 700 is initiated by identifying the user at the vehicle. Upon identification of the user at the vehicle, the system may authenticated the user at the vehicle, as illustrated in block 704. The user may be authenticated via communicable linkage between the autonomous vehicle system and the user device 701, user vehicle preferences 703, vehicle biometrics 705, and third party authentications 707. As illustrated in block 701, in some embodiments, the user device co-location may include the automotive system identifying a smart computing device of the user within a near field communication range, such as in the vehicle of the user or the like. The user may link his/her user device with the autonomous vehicle system calendar access, phone book access, applications, and the like. As such, after initial linkage, the user device and autonomous vehicle system may link each time the user device is co-located within the vehicle and may communicate the linkage to the system. As illustrated in block 703, in some embodiments, the user preferences may include user preferences within the vehicle, such as climate, mirror adjustments, seat adjustments, radio stations, driving styles, additional vehicle settings, and the like. As illustrated in block 705, in some embodiments, biometrics may include autonomous vehicle system biometrics linked to the system. The biometrics that may be linked to the system may include finger print reading on the steering wheel, door handle or the like, eye scanning, seat pressure reading, or the like that may identify a user and authenticate that the user is in the vehicle. As illustrated in block 707, in some embodiments, the third party systems may include user accessing a third party application that may require user authentication, such as the user device, mobile banking applications, music applications, map applications, and the like. The system may identify the user in the vehicle and accessing user specific third party applications, such as those requiring user authentication. In this way, the system may determine that the user is in the vehicle and a confidence that it is the user based on user accessing applications or the mobile device that may require passwords for authentication into the device or application.

As illustrated in block 706, the process 700 continues by transmitting the formatted data points to the vehicle for presentation upon user authentication. The data points may include any points of data that the autonomous vehicle may be able to digest and provide path guidance, location transmission, and other guidance. As illustrated in block 708, the process 700 continues by allowing for the autonomous vehicle system to digest and compute the data points provided by the system to the autonomous vehicle system for path guidance, location transmission, or other guidance.

Next, as illustrated in block 710, the process 700 continues by generating programmed routes, locations, notifications, and plans for the vehicle. In some embodiments, programmed routes may include identification of data points providing an indication of the locations the user desires to drive to via his/her vehicle. The system may program the locations of the travel into the autonomous vehicle system for efficient traveling and efficient determination of the order of stops for the vehicle travel. In some embodiments, programmed locations may include one or more locations that the user may desire to visit based on the data points transmitted to the vehicle system. In some embodiments, programmed notifications may include notifications or reminders to provide the user during his/her time in the vehicle based on the data points. In some embodiments, plans may include predicting locations and planning out a route map for the user to minimize distance traveled and shorten time of the travel based on the same.

As illustrated in block 712, the process 700 is completed by altering or performing functions for the programmed vehicle plans.

The level of authentication required may be increased or decreased based on (i) the collected device identification information for the local network devices associated with the previous electronic activities, (ii) the device identification information associated with the first computing device, and/or (iii) the device identification information associated with the local network devices in communication with the first local network. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities or locations) are permitted.

Figure 7:
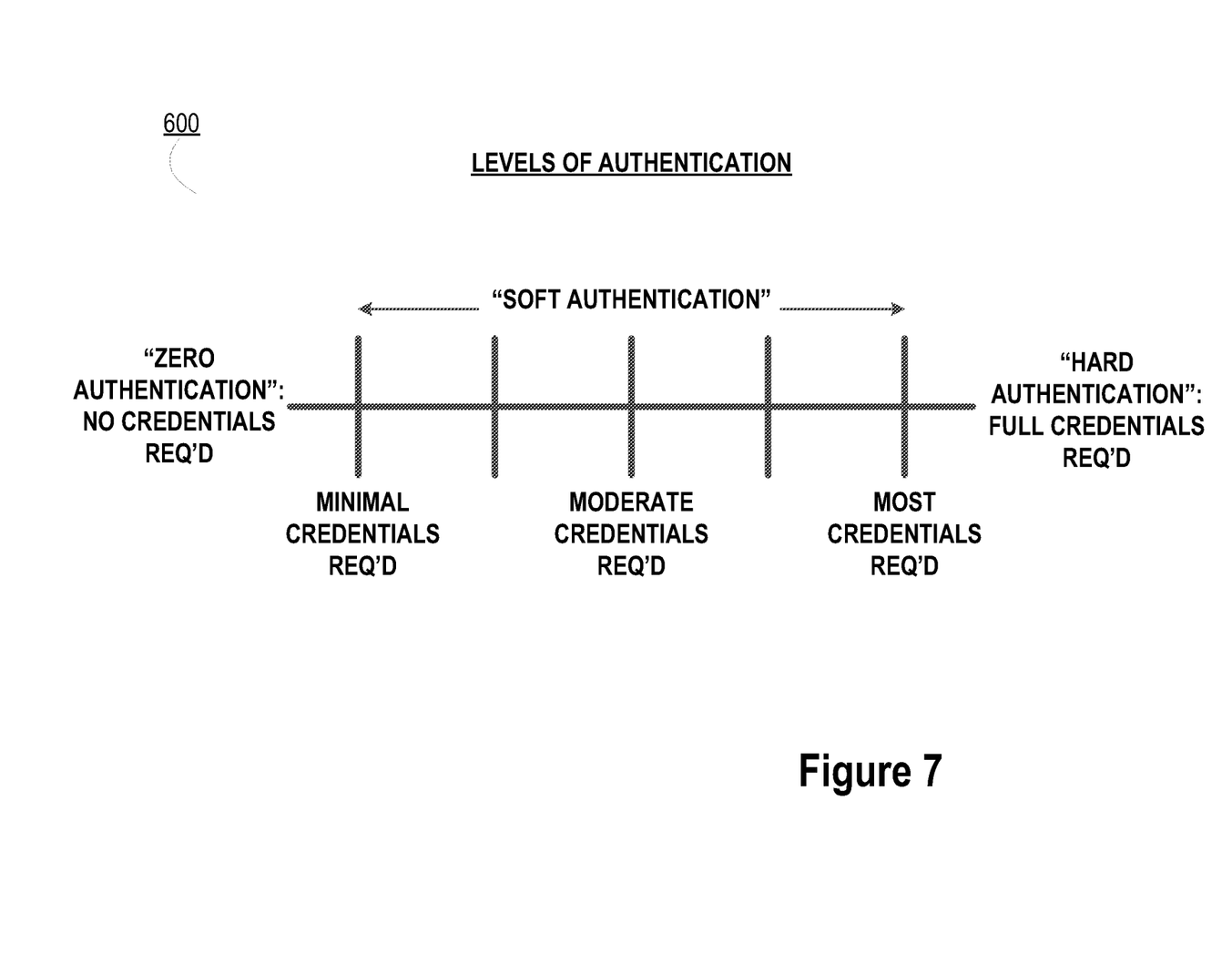
FIG. 7 presents an illustration of the authentication continuum in accordance to one embodiment of the invention.

Referring to FIG. 7, a continuum of authentication 600 is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. The continuum of authentication 600 may be coupled with a functions permitted continuum. A location requiring zero authentication does not require any authentication of a user within a vehicle. For example, no authentication may be needed for a drive through restaurant, payment of tolls, or the like where authentication of the user may not be required for the amount of the transaction. A hard authentication, on the other hand may require co-localization of the autonomous vehicle system and the user device and one or more additional user vehicle preferences, vehicle biometrics, and/or third party authentications. With this hard authentication, the user may be able to perform resource distributions, such as ATM transactions, resource transfers, account accessibility, and the like. In this way, for example, the user within the vehicle may pull up to a drive through ATM location. The system may confirm the hard authentication of the user in the vehicle and allow the user to withdraw resources from the ATM based on the pre-determined hard authentication. In some embodiments, in between the hard and soft authentication is a medium authentication requiring moderate credentials. These moderate credentials may include missing the co-localization of the user device and the automotive system, but confirmation of one or more other authentications. In other embodiments, the moderate credentials may include the co-localization of the user device and the automotive system, but not include one or more of the other authentications. As such, moderate credentials may include a single authentication of the user, without additional authentication confirmations of the user.

The functions permitted continuum illustrates various levels of functions permitted, such as functional access to the one or more locations requiring authentication. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum corresponds with a certain amount and/or number of functions that are permitted and/or the context in which certain functions are permitted.

The continua may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum provides that a particular function or functions may be permitted given that a specified level of authentication credentials are supplied, as indicated by the corresponding point on continuum 600A.

In some embodiments, one or both the continua may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required for authentication into one or more authentication locations and/or electronic activity may be increased or decreased based on: (i) the collected device identification information for the local network devices associated with the previous electronic activities, (ii) the device identification information associated with the first computing device, and/or (iii) the device identification information associated with the local network devices in communication with the first local network. For example, if the user is typically required to provide a username and password to access, but the level of authentication required is increased, then the user may be prompted to provide additional (e.g., secondary) authentication information, such as a PIN (e.g., personal identification number) or a zip code associated with the user. Additionally, if the user is typically required to provide a username and password to complete a type of activity, but the level of authentication required is decreased, then the user might only be required to provide a username.

The soft authentication continuum between zero authentication and hard authentication may include one or more authentication types. In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to pay for a toll by providing a credit vehicle number without a signature for the user to gain access to the tolled road. By way of further example, the user may need to provide the zip code associated with the user's account in order for the user to complete a mobile wallet transaction or for a completion of a transaction for fuel.

As evident from the preceding description, the system described herein represents an improvement in technology by generating a communicable linkage between an autonomous vehicle system and a user device along with varying levels of authentication in order to communicate with third party systems and authentication locations to allow user access based on pre-determined authentication by the user being in the vehicle. Accordingly, the system provides a technical solution for overcoming the problem of how to dynamically authenticate a user and determine levels of authentication required for access to a particular authentication location. Indeed, by automatically adjusting the level of required authentication based the identity of devices associated with an activity, the likelihood of an unauthorized activity being performed can be reduced.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for autonomous vehicle data digestion and implementation, the system comprising:
 one or more memory devices having computer readable code stored thereon;
 one or more processing devices operatively coupled to the one or more memory devices, wherein the one or more processing devices are configured to execute the computer readable code to:

identify a user within the autonomous vehicle based on an indication from an autonomous vehicle system or a user device;

identify devices associated with the user;

scan data across the devices associated with the user and identify one or more data points from the scanned data;

continually, in real-time, scanning data from the devices associated with the user;

convert data format of the one or more data points from the scanned data into readable format for the autonomous vehicle of the user;

calculate program functions for routes, locations, notifications, and plans for the autonomous vehicle based on the one or more data points;

authenticate the user within the vehicle based on at least one authentication point; and transmit and allow autonomous vehicle to the program functions based on the authentication of the user.

2. The system of claim 1, wherein one or more data points comprise data for autonomous vehicle digestion comprising routes, locations, notifications, and plans that translate to programmed functions for routes, locations, notifications, and plans for the autonomous vehicle upon next initiation of the vehicle.

3. The system of claim 1, wherein transmitting and allowing the autonomous vehicle to the program functions based on the authentication of the user, further comprises providing a readable format of the data points to the autonomous vehicle for route guidance and route planning for the user.

4. The system of claim 1, wherein identifying devices associated with the user further comprises identifying a wireless network of a user and identify all of the devices in communication with the wireless network.

5. The system of claim 1, further comprising generating a communicable linkage with the autonomous vehicle system and the user device to initiate the vehicle authentication for location access.

6. The system of claim 1, wherein authenticating the user within the vehicle based on at least one authentication point further comprises authenticating the user based on user device co-localization, user vehicle preferences, vehicle biometric identification indicators, or third party system authentications.

7. The system of claim 6, wherein the authentication point of user device co-localization further comprises identifying, via near field communication linkage, a linkage between the user device and the autonomous vehicle system indicating the user associated with the user device is within the vehicle.

8. The system of claim 6, wherein the authentication point of user vehicle preferences further comprises linking to the autonomous vehicle system to identify seat, radio, climate, and driving preferences of the user.

9. The system of claim 6, wherein the authentication point of vehicle biometric identification indicators further comprise authenticating a user via biometric sensors distributed on or within the vehicle.

10. The system of claim 6, wherein the authentication point of third party system authentications further comprises identifying the user authentication into third party applications while within the vehicle.

11. A computer program product for autonomous vehicle data digestion and implementation, the computer program product comprising at least one non-transitory computer-readable medium having computer-readable program code portions embodied therein, the computer-readable program code portions comprising:

an executable portion configured for identifying a user within the autonomous vehicle based on an indication from an autonomous vehicle system or a user device;

an executable portion configured for identifying devices associated with the user;

an executable portion configured for scanning data across the devices associated with the user and identify one or more data points from the scanned data;

an executable portion configured for continually, in real-time, scanning data from the devices associated with the user;

an executable portion configured for converting data format of the one or more data points from the scanned data into readable format for the autonomous vehicle of the user;

an executable portion configured for calculating program functions for routes, locations, notifications, and plans for the autonomous vehicle based on the one or more data points;

an executable portion configured for authenticating the user within the vehicle based on at least one authentication point; and an executable portion configured for transmitting and allowing autonomous vehicle to the program functions based on the authentication of the user.

12. The computer program product of claim 11, wherein one or more data points comprise data for autonomous vehicle digestion comprising routes, locations, notifications, and plans that translate to programmed functions for routes, locations, notifications, and plans for the autonomous vehicle upon next initiation of the vehicle.

13. The computer program product of claim 11, wherein transmitting and allowing the autonomous vehicle to the program functions based on the authentication of the user, further comprises providing a readable format of the data points to the autonomous vehicle for route guidance and route planning for the user.

14. The computer program product of claim 11, wherein identifying devices associated with the user further comprises identifying a wireless network of a user and identify all of the devices in communication with the wireless network.

15. The computer program product of claim 11, further comprising an executable portion configured for generating a communicable linkage with the autonomous vehicle system and the user device to initiate the vehicle authentication for location access.

16. The computer program product of claim 11, wherein authenticating the user within the vehicle based on at least one authentication point further comprises authenticating the user based on user device co-localization, user vehicle preferences, vehicle biometric identification indicators, or third party system authentications, wherein the authentication point of user device co-localization further comprises identifying, via near field communication linkage, a linkage between the user device and the autonomous vehicle system indicating the user associated with the user device is within the vehicle, wherein the authentication point of user vehicle preferences further comprises linking to the autonomous vehicle system to identify seat, radio, climate, and driving preferences of the user, wherein the authentication point of vehicle biometric identification indicators further comprise authenticating a user via biometric sensors distributed on or within the vehicle, wherein the authentication point of third party system authentications further comprises identifying the user authentication into third party applications while within the vehicle.

17. A computer-implemented method for autonomous vehicle data digestion and implementation, the method comprising:
    providing a computing system comprising a computer processing device and a non-transitory computer readable medium, where the computer readable medium comprises configured computer program instruction code, such that when said instruction code is operated by said computer processing device, said computer processing device performs the following operations:
    identifying a user within the autonomous vehicle based on an indication from an autonomous vehicle system or a user device;
    identifying devices associated with the user;
    scanning data across the devices associated with the user and identify one or more data points from the scanned data;
    continually, in real-time, scanning data from the devices associated with the user;
    converting data format of the one or more data points from the scanned data into readable format for the autonomous vehicle of the user;
    calculating program functions for routes, locations, notifications, and plans for the autonomous vehicle based on the one or more data points;
    authenticating the user within the vehicle based on at least one authentication point; and
    transmitting and allowing autonomous vehicle to the program functions based on the authentication of the user.

18. The computer-implemented method of claim 17, wherein one or more data points comprise data for autonomous vehicle digestion comprising routes, locations, notifications, and plans that translate to programmed functions for routes, locations, notifications, and plans for the autonomous vehicle upon next initiation of the vehicle.

19. The computer-implemented method of claim 17, wherein transmitting and allowing the autonomous vehicle to the program functions based on the authentication of the user, further comprises providing a readable format of the data points to the autonomous vehicle for route guidance and route planning for the user.

20. The computer-implemented method of claim 17, wherein identifying devices associated with the user further comprises identifying a wireless network of a user and identify all of the devices in communication with the wireless network.

* * * * *